Feb. 10, 1970   J. B. SMITH   3,494,639
FITTING FOR FIRE EXTINGUISHING SYSTEMS
Filed June 21, 1968   2 Sheets-Sheet 1
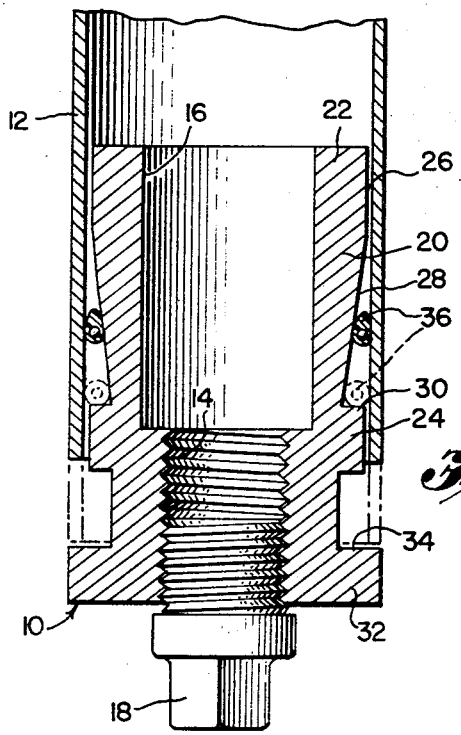
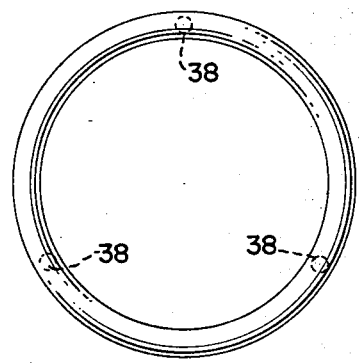
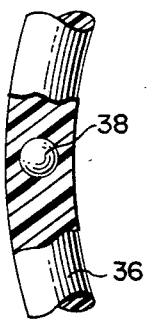
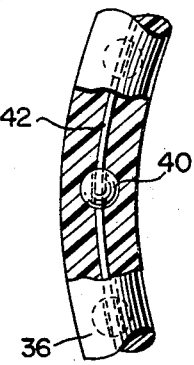
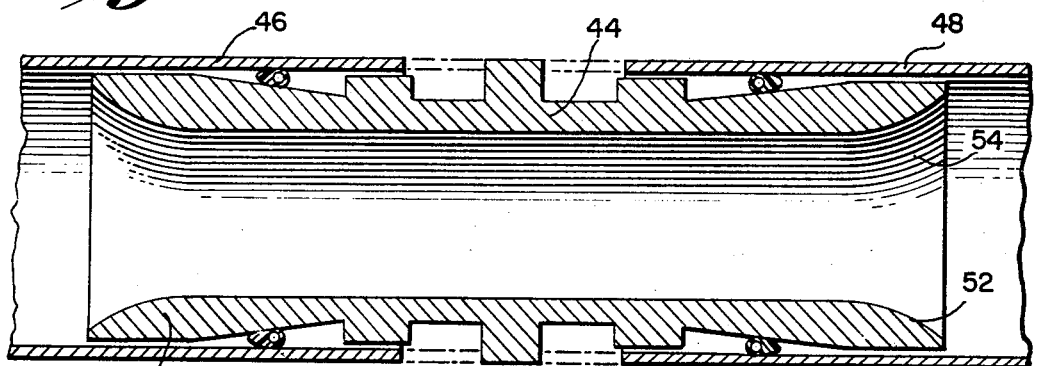
INVENTOR
JAMES B. SMITH
BY Lane, Aitken, Dunner & Ziems
ATTORNEYS Feb. 10, 1970  J. B. SMITH  3,494,639
FITTING FOR FIRE EXTINGUISHING SYSTEMS
Filed June 21, 1968  2 Sheets-Sheet 2

INVENTOR
JAMES B. SMITH

BY Lane, Aitken, Dunner & Ziems
ATTORNEYS

United States Patent Office 3,494,639
Patented Feb. 10, 1970

3,494,639
FITTING FOR FIRE EXTINGUISHING SYSTEMS
James B. Smith, Wellesley Farms, Mass., assignor to Factory Mutual Research Corporation, Norwood, Mass., a corporation of Massachusetts
Filed June 21, 1968, Ser. No. 739,040
Int. Cl. F16l 17/02
U.S. Cl. 285—113                                    15 Claims

ABSTRACT OF THE DISCLOSURE

A fitting for fire extinguishing systems, which may serve as a plug, pipe coupling or the like has a tapered peripheral portion receivable telescopically on a smooth surfaced pipe together with a rolling elastomeric sealing and retention ring. The ring is welded between the tapered portion and the pipe and has independently rolling elements embedded therein so that even when subjected to excessive separating force which would extrude the ring or at temperatures existing during a fire, the rolling elements function to retain the fitting even though the elastomeric material of the ring may have been destroyed.

BACKGROUND OF THE INVENTION

This invention relates to fittings for use in fire protection (extinguishing) systems, and more particularly, it concerns a combined sealing and retaining structure by which such fittings as plugs, couplings, and the like are readily and simply interconnected with the extinguishant carrying pipes of a fire extinguishing system in a manner such that a hermetic seal is effected between the fitting and the pipe at normal temperatures and whereby a positive mechanical interlock between the fitting and the pipe is insured even when subjected to excessive longitudinal force such as due to contraction of long pipe runs fastened at both ends as a result of cooling from high temperatures existing under the conditions of a fire.

Traditionally, automatic fire extinguishing systems of the type in which an extinguishant, such as water, is supplied automatically to sprinkling nozzles located throughout a building, have employed threaded steel pipes and cast iron fittings for connecting the various branches of the system to the source of water or other extinguishant. Among the principal difficulties with such systems is that they are expensive to install principally because of the high cost of labor. Also, the pipes and connecting fittings, such as couplings, are inflexible and brittle. As a result, the systems often fail in a burning building by virtue of ruptured pipes, couplings or both, thereby rendering portions of the system inoperable from the standpoint of conveying water or other extinguishant to the area in a burning building where it is needed. Further, accidental freezing of water characteristically ruptures the cast iron fittings, which nullifies the system protection until the ruptured fittings can be replaced. The use of copper, aluminum or stainless steel pipe for such fire extinguishing systems offers a ready solution to these problems both from the standpoint of costs of installation and from the standpoint of providing flexibility in the fire extinguishing system to the extent that complete failure or breakage is not likely to occur even under conditions where the building structure begins to fail. Moreover, copper, aluminum and stainless steel piping have the desirable characteristic of offering indefinite flow efficiency or smoothness from the standpoint of resisting corrosive scale formation and pitting and thus maintaining an acceptable coefficient of friction resisting water or other extinguishant flow when such flow is needed.

One of the major problems associated with the use of copper or aluminum pipes in fire extinguishing systems has been the lack of a suitably acceptable and low-cost means for connecting the individual links of pipe in the system to each other as well as the coupling of various fittings such as plugs or sprinkler heads to the system pipes. In this respect, it should be noted that there are many situations in which dry systems must be used; that is, a system in which the pipes running throughout the building do not actually contain water or the fire extinguishant, but instead, are connected at some point to a source of water or the like and equipped with an automatic valve, which in response to fire temperatures, opens to fill the system with water or other extinguishant used. Dry systems of this type are essential for use in buildings where freezing temperatures are incurred or in situations where any likelihood of water damage by virtue of failure in the system must be avoided. It will be appreciated therefore, that in such dry systems, the pipes and plumbing fittings, such as couplings, sprinkler heads and the like, must be able to withstand fire temperatures for a brief period of time until the water or other extinguishant is available as a coolant. Accordingly, it will be appreciated that conventional soft soldered joints of the type employed with copper plumbing are unacceptable for use in fire extinguishing systems. Also, welded and soldered joints require open flames or other heat sources which may start fire in a building whose protection is not yet in service.

It is also essential that under normal room temperatures the joints or other fitting connections in a fire extinguishing system be leakproof even in a dry system. The principal reason for this requirement is that dry systems conventionally employ a supervisory air pressure to actuate a valve to admit water and to indicate when any part of the system is damaged or otherwise has developed a leak. In order for the air pressure to be used effectively in this sense, it is important that the joints within the fire extinguishing system be devoid of leaks which would create false indications of trouble. On the other hand, and under the conditions of a fire, quite obviously a degree of leakage can be tolerated locally provided any part of the system is not isolated by such leakage from the source of water or fire extinguishant.

SUMMARY OF THE INVENTION

In accordance with the present invention, a fitting is provided by which the desirable attributes of corrosion resistant smooth surfaced materials such as copper, aluminum or stainless steel pipes can be used effective in a fire extinguishing system of the type referred to above. Essentially, the fitting of this invention, whether used as a coupling, plug or other member in the system, includes a body portion adapted to be fitted telescopically on a pipe of the system and having a diameter corresponding to that of the pipe to provide a slight clearance when the pipe and fitting are disposed one within the other. The body portion is formed with a tapered or frusto-conical portion, the opposite sides of which converge in a direction so that a rolling, sealing and retention ring received between the frustoconical portion and the pipe becomes wedged between the tapered surface on the body portion and the surface of the pipe adjacent to the ring. The ring is formed of conventional elastomeric material which will provide an effective seal as well as an anchorage between the fitting and the pipe under normal forces and temperatures. Contained within the elastomeric material of the ring are high temperature, high compressive strength rolling members formed preferably of stainless steel or the like and which in turn are dimensioned so as to be larger than the clearance between the fitting and the pipe to which the fitting is connected and of such number as to be spaced apart, one from another, even should all members be in contact with the pipe surface. Thus, at temperatures which exist in a fire, and at which the elastomeric sealing material would fail, the rolling members remain to insure a continued positive mechanical connection of the fitting and the pipe. This arrangement not only is effective from the standpoint of maintaining the desired sealing and connecting features after installation, but greatly facilitates installation of the system since it is necessary only to assemble the body member telescopically on the end of a pipe and then withdraw it partially until the sealing ring becomes wedged between the fitting body portion and the pipe. If partial withdrawal is not feasible, in certain embodiments of the invention, the sealing rings can be wedged by building up internal air or water pressure, as in the hydrostatic test.

Among the objects of the present invention, therefore, are: the provision of a fitting for use in fire extinguishing systems which is easy to install without heat sources such as open flames and which enables the use of smooth surfaced corrosion resistant materials such as copper, aluminum or stainless steel pipes in such a system; the provision of a fitting connection which is adaptable to numerous fittings in a fire extinguishing system such as plugs, couplings, T's and elbows; and the provision of a unique sealing ring for use in a wedge-type fitting connection which insures effective sealing and mechanical interconnection even with excessive separating forces on the joint at normal temperatures and as well as a positive mechanical interconnection at high temperatures. Other objects and further scope of applicability of the present invention will become apparent from the detailed description to follow taken in conjunction with the accompanying drawings.

BRIEF DESCRIPTION OF THE DRAWINGS

FIG. 1 is a longitudinal cross-section through a pipe in a fire extinguishing system showing one form of fitting of this invention secured therein;

FIG. 2 is an end view of one form of the sealing and retention ring in accordance with the present invention;

FIG. 3 is an enlarged fragmentary view in partial cross-section of the sealing and retention ring shown in FIG. 2;

FIGS. 4 and 5 are respectively, enlarged fragmentary views in partial cross-section showing alternative embodiments of the sealing and retention ring shown in FIGS. 2 and 3;

FIG. 6 is a longitudinal cross-section showing the fitting of this invention adapted as a coupling to connect a pair of pipes end for end;

DETAILED DESCRIPTION OF THE PREFERRED EMBODIMENTS

Figure 7:
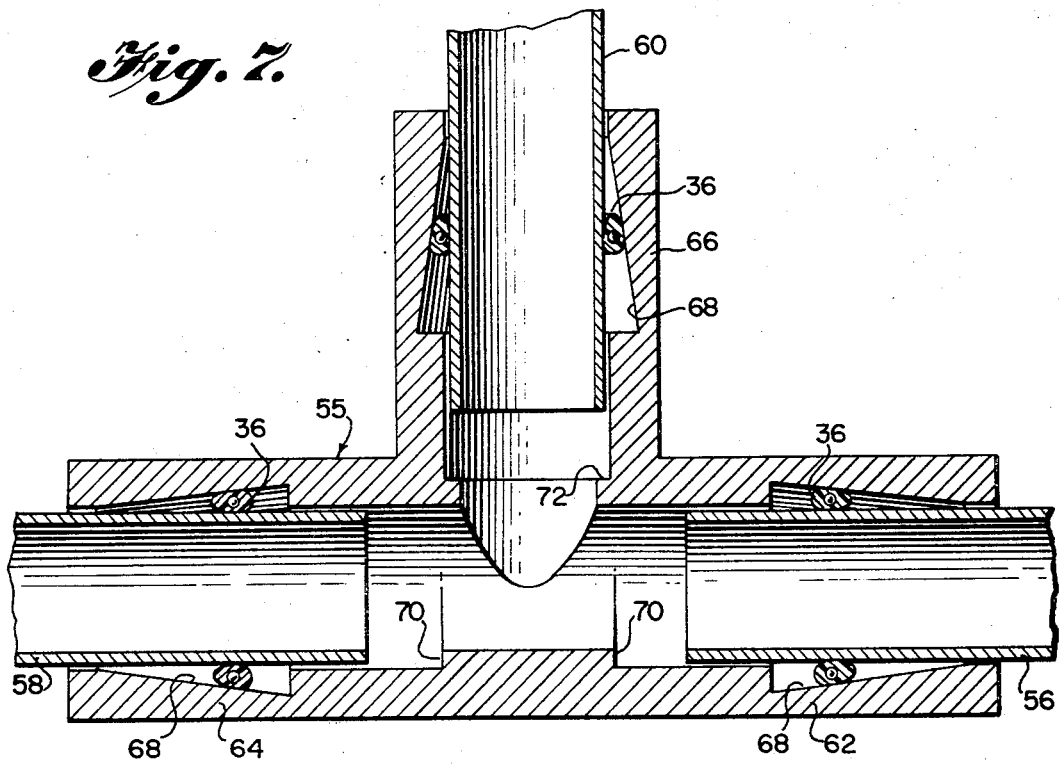
FIG. 7 is a cross-section of a further modification of this invention adapted as an external sleeve-type T coupling.

In FIG. 1, the fitting of this invention is shown in the form of an adapter plug generally designated by the reference numeral 10 and received within a vertically disposed smooth surfaced pipe 12. In the arrangement shown in FIG. 1, the plug 10 is provided with an axial threaded bore 14 and a communicating counterbore 16, a conventional externally threaded end plug 18 being received in the threaded bore 14. This arrangement could be adapted for the connection of a sprinkler head by unthreading the plug 18 and threading a conventional sprinkler head into the bore 14, in which case the pipe 12 would be a riser or a down spout extending from a branch line in the fire extinguishing system (not shown).

The plug 10 therefore includes a body portion 20 having a pair of axially spaced cylindrical external surface portions 22 and 24 of a diameter slightly less than the inside diameter of the pipe to provide a slight clearance 26 between the fitting body and the pipe. A tapered or frustoconical external surface portion 28 extends between the cylindrical surface portions 22 and 24. As shown in FIG. 1, a shoulder 30 is formed between the cylindrical surface 24 and the point of smallest diameter of the tapered portion 28.

The outer end of the plug is formed with a flange 32 of a sufficient diameter to prevent the fitting to be completely advanced into the pipe 12. Thus, an inner radial face 34 on the flange 32 serves as an abutment stop for limiting the extent to which the body portion 20 may be urged into the pipe 12.

A combined sealing and retaining ring 36 is positioned about the body portion on the tapered surface 28 initially in the position shown in phantom lines in FIG. 1. To assemble the plug-fitting within the pipe 12, the fitting is advanced into the pipe until the stop 34 engages the end of the pipe. Thereafter it is withdrawn slightly out of the pipe so that the ring 36, being of such radial dimensions as to impose a frictional drag between the conical surface 28 and the interior of the pipe, rolls into wedging engagement between the body portion 20 and the interior of the pipe 12. In the ultimate position as shown in solid lines in FIG. 1, the ring 36 will be compressed radially in such a manner that any tendency for the fitting to be withdrawn from the pipe will be opposed by resistance of the ring to increased compression.

In accordance with an important feature of the present invention, the ring 36 as shown in FIGS. 2–4 of the drawings, is preferably formed of a suitable elastomeric sealing material such as rubber or synthetic resinous rubber substitutes, so as to insure a hermetic seal between the body portion 20 and the pipe 12 under normal room temperatures to which the fire extinguishing system is exposed in an inactive condition. Embedded within the ring 36 are discrete rolling elements which may be in the form of spheres 38 of a diameter exceeding the lateral dimension of the clearance 26 between the body portion 20 and the pipe 12. Also, the rolling elements or spheres 38 as shown in FIGS. 2 and 3 of the drawings, are preferably formed of high temperature high strength materials such as stainless steel or the like and are symmetrically disposed about the ring. In FIG. 2, for example, three such rolling elements 38 are shown disposed at angles of 120 degrees about the circumference of the ring. It is contemplated, however, that any number of rolling elements 38 might be used in the ring, provided there is slight spacing apart each from the other.

The importance of the rolling elements 38 is that they provide a means by which the mechanical retention of the fitting 10 within the pipe 12 is insured under excessive axial separating force and/or under the high temperatures that exist in a fire. At these temperatures, it will be appreciated that the elastomeric material from which the ring 36 is formed more than likely will have been softened and destroyed or at least will have lost its ability to retain the fitting within the pipe. When subjected to excessive separating force, the material may be extruded or crushed. Because of the independent rolling elements or spheres 38, however, any tendency for the body 12 to be expelled from the pipe 16 under a separating force such as from line pressure will be checked by wedging engagement of the rolling spheres 38 between the inclined or tapered surface 28 and the pipe 12. Though obviously, leakage will occur under such conditions, the leakage is slight and occurs at a time when it is inconsequential from the standpoint of discharging and producing water damage or conveying a fire extinguishant through the joint.

In FIG. 4 of the drawings, an alternative embodiment of the sealing ring 36 is shown. In this embodiment, rolling elements 39, which are oblong in shape, are embedded within the elastomeric material of the ring 36 so that their major or rolling axes are disposed circumferentially of the ring. The rolling elements 39, because of their oblong shape, engage the inside of the pipe over a longer arc than spheres and thus are less likely to deform the wall of the pipe outwardly in a localized point or area.

A further alternative embodiment of the sealing ring 36 is shown in FIG. 5. In this instance, a series of bead-like spheres 40 are strung on a flexible circular strand or supporting element 42 and disposed concentrically within the elastomeric material. Since the beads 40 are free to rotate independently on the supporting strand 42, the same rolling action as occurred with the discrete elements 38 in the embodiment of FIGS. 2 and 3 occurs. Also, the strand 42 should possess some measure of circumferential extensibility so that axial movement of the spheres 40 relative to the tapered portion 28 will be unhampered.

In FIG. 6 of the drawings, the fitting of this invention is shown in the form of a coupling element 44 for connecting a pair of pipes 46 and 48 in end to end relation. The structure of the coupling 44, from the standpoint of its engagement with the respective pipes 46 and 48 is identical in all respects to the plug-type fitting 10 as shown in FIG. 1. In this instance, however, two body portions 50 and 52 having a continuous smooth surfaced central bore 54 are provided to effect fluid communication between the pipes 46 and 48. It will be apparent to those skilled in the art that the connection of this invention can be adapted to other types of fittings conventionally employed in fluid handling systems, such fittings including T's and elbows among others.

Figure 8:
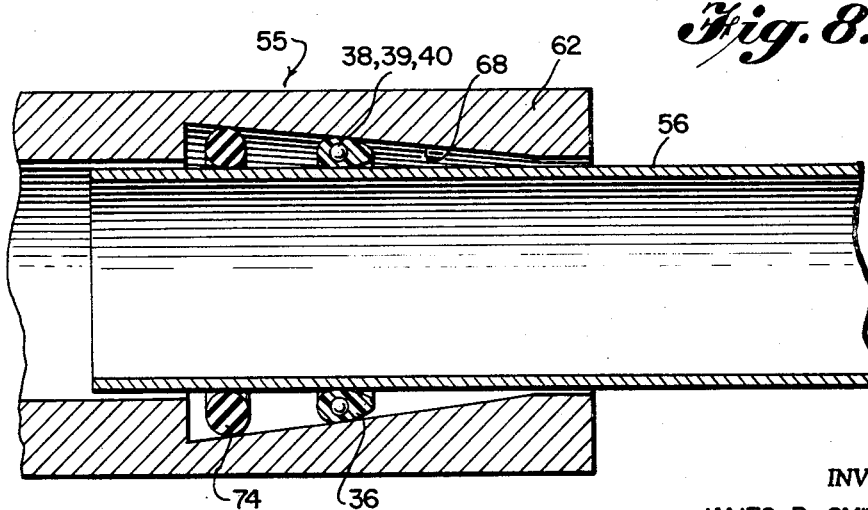
FIG. 8 is an enlarged fragmentary cross-section showing a modified sealing arrangement for the embodiment of FIG. 7.

In each of the embodiments of FIGS. 1 and 6 of the drawings, the fittings illustrated are received telescopically within the pipes to which they are connected. This arrangement is particularly suitable for relatively weak, thin walled pipes for such materials as copper or aluminum in that the stresses imposed on the pipe by the sealing ring and/or the rolling elements embedded therein are in the nature of hoop stresses which place the material of the pipe in tension. The strength of the pipe under such stresses is significantly greater than it would be where the pipe might be placed in compression. As a result of a compressive load, the same pipe might collapse under the pressures experienced and thereby permit the fitting to be expelled or released from the pipe. Fittings received within the pipe however, suffer the disdavantage of presenting an obstruction to flow. Hence, where the pipes to which the fittings are to be connected are sufficiently thick or where such relatively strong material as stainless steel is employed or where the compressive load is distributed around the periphery by a plurality of rolling elements, and the danger of the pipe collapsing is not presented, the present invention may be adapted as an external sleeve telescopically received over the outside diameter of the pipe thereby to minimize the obstruction to flow presented by the coupling in a fire extinguishing system. Such an arrangement is shown in FIGS. 7 and 8 of the drawings. A further advantage of this external sleeve is that internal fluid pressure exclusively wedges the ring even though the pipe should not retract from the fitting and roll the ring. Thus, a system of fittings and pipe could be assembled and all of the joints secured in place. To "make up" the joints it would merely be necessary to subject the system to the hydrostatic test pressure. This would wedge all of the sealing rings in a most economical and efficient manner, meanwhile, preserving the exact location and spacing of all fittings. A still further advantage of the external sleeve construction is that disassembly can be facilitated by a tool (not shown) in the form of a split sleeve forcible into the clearance between the fitting and pipe to move the ring out of engaging contact with the pipe.

In FIG. 7, the fitting of the present invention is shown as a T 55 for interconnecting three pipes 56, 58 and 60. Each of the three pipes is telescopically received within corresponding body portions or legs 62, 64 and 66, respectively of the T 55. As in the embodiment of FIGS. 1 to 6, the telescoping body portions of the fitting 55 each are formed with a tapered or frusto-conical surface portion 68, the opposite sides of each such tapered portion 68 converging in a direction so that when the retaining ring 36 is positioned between the tapered portion 68 and the respective pipes, movement of the pipes out of the fitting results in compression of the ring 36. As in the previous embodiment, the radial dimension of the ring 36 as well as the rolling diameter of the elements embedded therein are sufficiently large in size so that they will not pass through the clearance between the inside of the respective body portions 62, 64 and 66 and the outside diameters of the pipes telescopically received therein.

Also as in the previous embodiment, abutment stops 70 serve to limit the maximum extent to which the pipes 56 and 58 can be inserted into the fitting whereas a stop 72 limits the maximum extent to which the pipe 60 may be inserted into the body portion or leg 66. It will be appreciated that the manner of assembly in connection with the embodiment of FIG. 7 may parallel the embodiments of FIGS. 1 and 6 in that the pipes 56, 58 and 60 can be inserted all the way in against the stops 70 and 72 and withdrawn slightly so that the rings 36 are wedged between the tapered portions 68 and the outside diameter of the pipes. Assembly of this embodiment can be effected even more advantageously by imposing an internal pressure on the system after preassembly of the pipes against the stops of the fitting thereby to advance the sealing rings into wedging engagements. Also, the fitting represented by this embodiment may be removed by the use of a split sleeve (not shown) which may be forced into the annular clearance between the outside of the tube and the inside of the fitting so as to remove the friction grip of the ring from the tube surface.

In FIG. 8, an alternative sealing arrangement is shown. Although this sealing arrangement, in itself, may be adapted to either of the embodiment of FIGS. 1 and 6 or FIG. 7, it is shown in a fitting represented by the embodiment of FIG. 7. In this instance, the sealing ring 36 having the rolling elements 38, 39 or 40 embedded therein is provided on the tapered surface 68 to provide the principal sealing and retention of the fitting on the pipe 56, for example. Should the pressure of the system, however, be sufficient so that the relatively hard rolling elements 38, 39 and 40 project through the elastomeric material of the ring 36, the hermetic seal between the body portion 62 of the fitting 55 and the pipe 56 might be damaged or lost. Accordingly, a conventional O-ring 74 is also disposed within the grove established by the tapered surface portion 68 as a backup hermetic seal element. Thus, additional insurance against leaks is provided in the embodiment of FIG. 8.

Thus it will be seen that by this invention there is provided an extremely effective pipe fitting connection particularly useful in fire extinguishing systems and by which the above stated objectives, among others, may be fully realized. It will be appreciated further that the present invention may be incorporated in fitting designs other than those expressly described and/or illustrated herein.

I claim:
1. A sealing and retention member for interconnecting fittings and pipes in fluid handling systems subject to wide variations in ambient temperatures, the fitting having a tapered surface portion to define a tapered annulus with the pipe when in telescoping relation therewith, said member comprising: an annular ring of elastomeric material capable of maintaining its physical properties at normal temperatures, said ring being circular in radial cross-section, and independent rolling elements completely embedded within said elastomeric material, said rolling elements being formed of rigid material capable of maintaining its physical properties at relatively high temperatures, said ring adapted to be received in the tapered annulus between the fitting and the pipe, the diameter of said radial cross-section being sufficient in size to resist axial displacement of the fitting relative to the pipe by its being wedged into frictional rolling engagement between the tapered surface portion on the fitting and the pipe, the diameter of said rolling elements on their rolling axes being less than the diameter of said radial cross-section but large enough so that in the event the elastomeric material of said ring is destroyed by heat, said rolling elements are operable to retain the fitting and the pipe against relative axial displacement.

2. The apparatus recited in claim 1 in which said rolling elements are discrete spheres.

3. The apparatus recited in claim 1 wherein said rolling elements are strung on a strand and rotatable independently on said strand, said strand also being embedded within said elastomeric material.

4. The apparatus recited in claim 1 wherein said rolling elements are formed of stainless steel.

5. The apparatus recited in claim 1 wherein said rolling elements are oblong in shape and embedded within the elastomeric material so that the major axes thereof are disposed circumferentially.

6. A fitting for use in fluid handling systems subject to wide variations in ambient temperatures employing smooth surfaced pipes, said fitting being adapted for anchorage against displacement relative to a pipe of the system under all temperatures and pressures to which the pipe is exposed and to effect a seal with the pipe under normal temperatures, said fitting comprising: a body portion receivable telescopically with a slight clearance on a pipe of the system and having a tapered surface portion extending from said clearance, and a continuous sealing and retention ring having a circular radial cross-section and positioned between said tapered surface portion on said body and the pipe, the diameter of said radial cross-section being sufficient in size to resist axial displacement of said body relative to said pipe by its being wedged into frictional rolling engagement between said tapered surface portion and said pipe, said sealing ring being formed of elastomeric material capable of maintaining its physical properties at relatively low temperatures and having completely embedded therein independent roller elements formed of rigid material capable of maintaining its physical properties at relatively high temperatures capable of destroying the physical properties of said elastomeric material, said elements having a rolling diameter smaller than that of said radial cross-section but larger than said clearance whereby said elements are operable to retain the fitting and the pipe against relative axial displacement in the event the elastomeric material of the ring is destroyed.

7. The apparatus recited in claim 6 in which said tapered surface portion extends between a pair of spaced cylindrical surface portions, one of said cylindrical surface portions establishing a shoulder operative to hold said sealing ring axially on said body relative to a pipe.

8. The apparatus recited in claim 6 including abutment stop means on said body for limiting telescopic movement thereof into a pipe.

9. The apparatus recited in claim 6 wherein said body is annular in cross-section to define a flow path therein.

10. The apparatus recited in claim 9 wherein said fitting includes at least two of said body portions with communicating flow paths thereby to provide a coupling for connecting at least two pipes.

11. The apparatus recited in claim 6 in which said body portion is receivable within a pipe, said tapered portion having a maximum diameter slightly less than the inside diameter of the pipe to provide said clearance.

12. The apparatus recited in claim 6 in which said body portion is a sleeve receivable over the outside of the pipe, said tapered surface portion being formed on the inside of said sleeve.

13. The apparatus recited in claim 6 including an additional sealing ring of elastomeric material.

14. The apparatus recited in claim 13 wherein said additional sealing ring is positioned downstream from said first mentioned ring relative to the direction in which system pressure acts on said fitting.

15. In a fixed fire extinguishing system for supplying an extinguishant to an enclosure upon the development of a fire therein, the combination of smooth surfaced pipes and fittings for connection to said pipes, said fitting comprising body portions receivable telescopicaly with slight clearances on said pipes, each of said body portions having a tapered surface portion extending from said clearance, and a continuous sealing and retention ring of substantially circular radial cross-section and being wedged respectively into frictional rolling engagement between said tapered surface portions and the pipes received therein, said sealing rings being formed of elastomeric material capable of maintaining its physical properties at a relatively low ambient temperature and having embedded therein indepedent roller elements formed of rigid material capable of maintaining its physical properties at the high temperatures which exist during a fire, said elements having a diameter larger than the clearance between the tapered portions and the pipes but smaller than the radial dimensions of said sealing ring and completely embedded therein, whereby said sealing rings function to seal and mechanically couple said fitings and said pipes under normal temperatures and wherein said rolling elements retain the mechanical interconnection of said fittings and said pipes at temperatures which destroy said elastomeric material.

References Cited

UNITED STATES PATENTS

| | | | |
|---|---|---|---|
| 643,802 | 2/1900 | Morison | 285—344 X |
| 870,428 | 11/1907 | Graham | 277—235 |
| 1,508,026 | 9/1924 | Noble | 285—344 X |
| 2,226,304 | 12/1940 | Dillon | 285—105 X |
| 2,283,975 | 5/1942 | Dillon | 285—104 |
| 2,710,630 | 6/1955 | Greer | 277—235 X |
| 2,880,019 | 3/1959 | Wurtz et al. | |
| 3,027,179 | 3/1962 | Wiltse. | |
| 3,169,025 | 2/1965 | Borah | 277—235 |

FOREIGN PATENTS

| | | |
|---|---|---|
| 858,164 | 12/1952 | Germany. |
| 310,452 | 6/1920 | Great Britain. |

THOMAS F. CALLAGHAN, Primary Examiner

U.S. Cl. X.R.

277—26, 235; 285—156, 344, 370